United States Patent [19]

Chu

[11] Patent Number: 4,869,041

[45] Date of Patent: Sep. 26, 1989

[54] OCTET SPACE FRAME STRUCTURE AND COMPONENTS FOR ASSEMBLING SUCH SPACE FRAMES

[76] Inventor: Russell Chu, 2400 Beverly Ave., No. 18, Santa Monica, Calif. 90405

[21] Appl. No.: 66,026

[22] Filed: Jun. 24, 1987

[51] Int. Cl.$^4$ .......................................... E04H 12/00
[52] U.S. Cl. ...................... 52/646; 52/648; 403/327; 403/316; 403/171; 403/176
[58] Field of Search ............... 52/648, 650; 403/327, 403/316, 171, 172, 176

[56] References Cited

U.S. PATENT DOCUMENTS

| | | | |
|---|---|---|---|
| 1,881,681 | 10/1932 | Klumpp | 403/327 |
| 3,827,206 | 8/1974 | Nierle | 52/648 |
| 3,974,611 | 8/1976 | Satterthwaite | 52/648 |
| 4,308,699 | 1/1982 | Slysh | 403/171 |
| 4,579,302 | 4/1986 | Schneider | 52/648 |
| 4,637,193 | 1/1987 | Lange | 403/171 |
| 4,652,170 | 3/1987 | Lew | 403/171 |

OTHER PUBLICATIONS

Order in Space by Keith Critchlow, p. 110, ©Critchlow 1969, printed by Jarrold and Sons, Ltd., Norwich.
Space Grid Structures by John Borrego, plates 71, 72, 73, 74, 95, 96, 97 and 98, ©MIT 1968.

*Primary Examiner*—Henry E. Raduazo
*Attorney, Agent, or Firm*—Saul Epstein

[57] ABSTRACT

A space frame constructed from a plurality of identical struts using octahedron/tetrahedron ("octet") geometry wherein the struts, instead of being simple tubular members, are fabricated as space frame masts using octet geometry. A second aspect of the invention concerns a connector piece for orienting and joining the ends of struts to form octet structures. In one embodiment, the connector piece is in the shape of two interpenetrating tetrahedrons, allowing assembly and disassembly of individual struts without disturbing other struts. Retaining means are described which do not require tools for assembly.

1 Claim, 4 Drawing Sheets

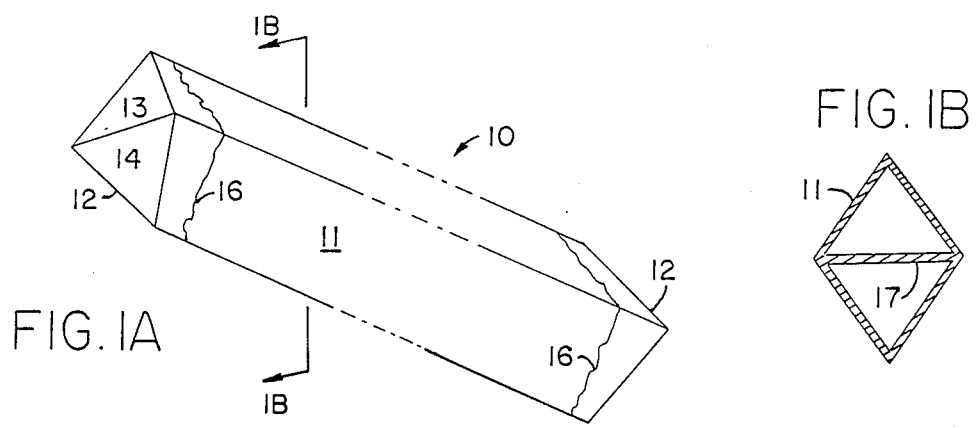
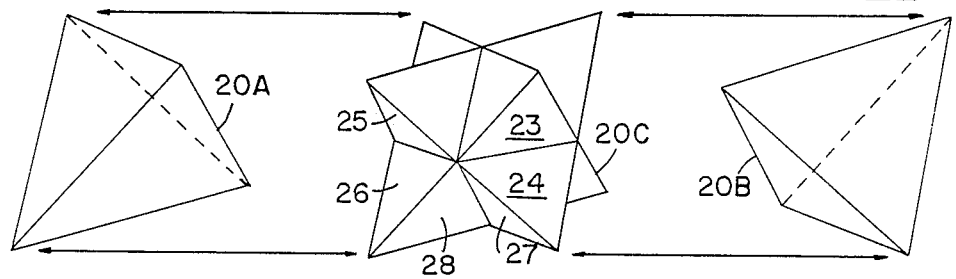
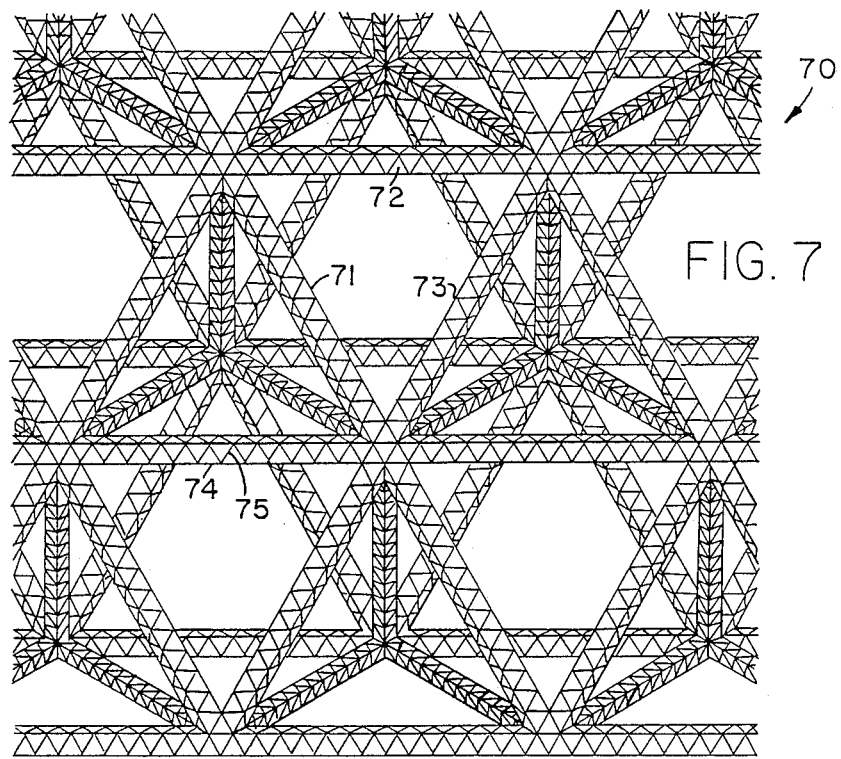

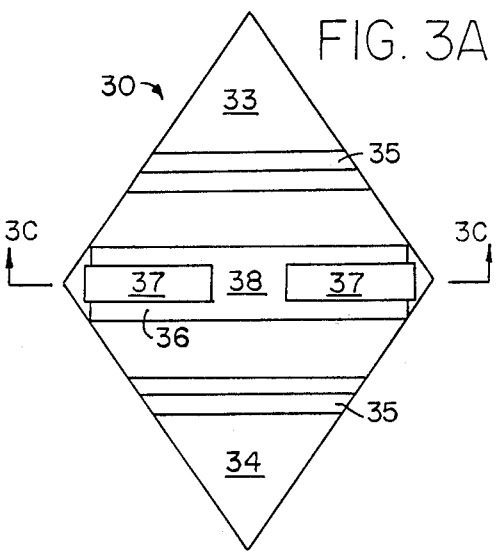
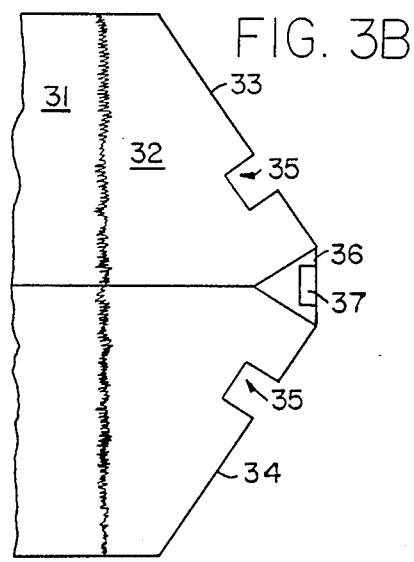
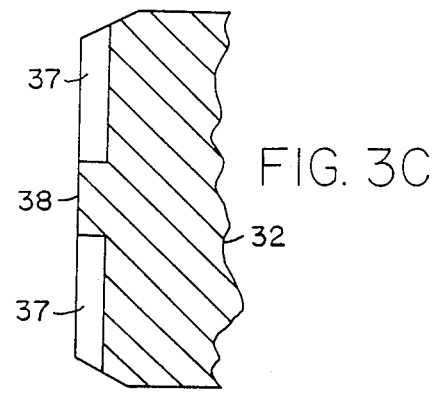
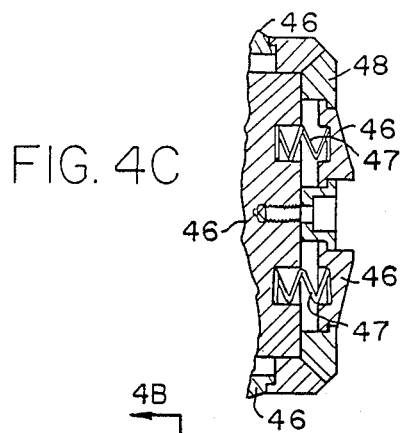
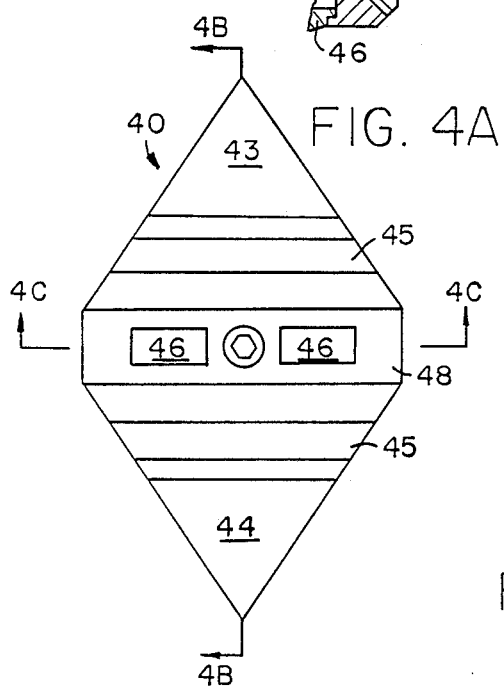
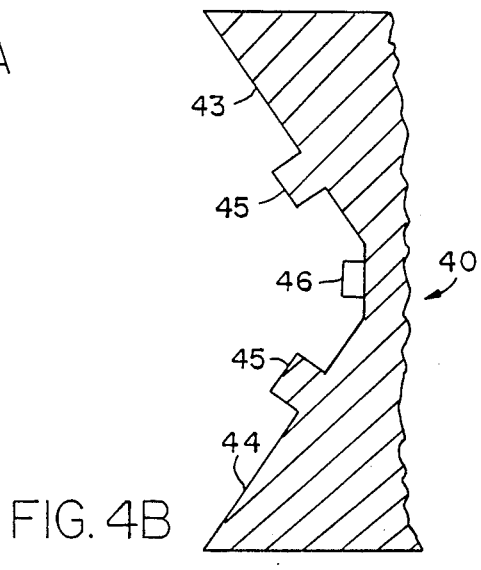

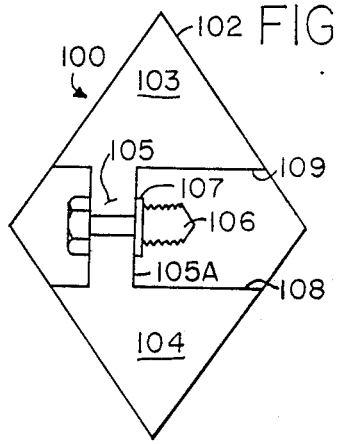
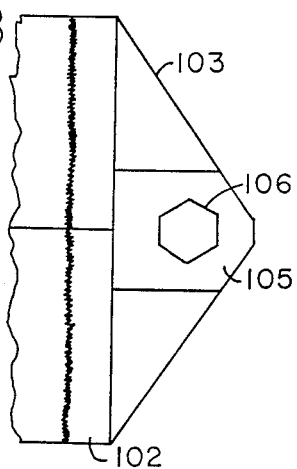
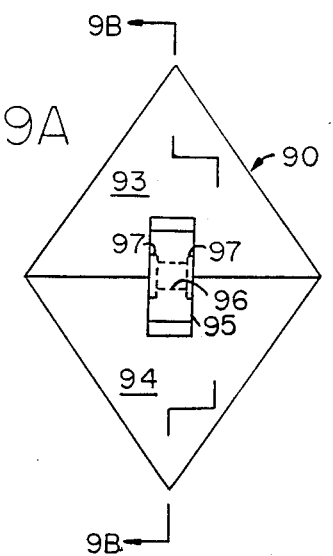
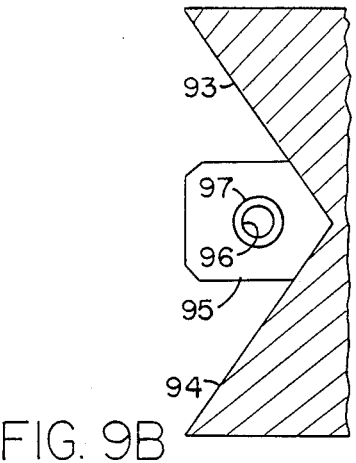
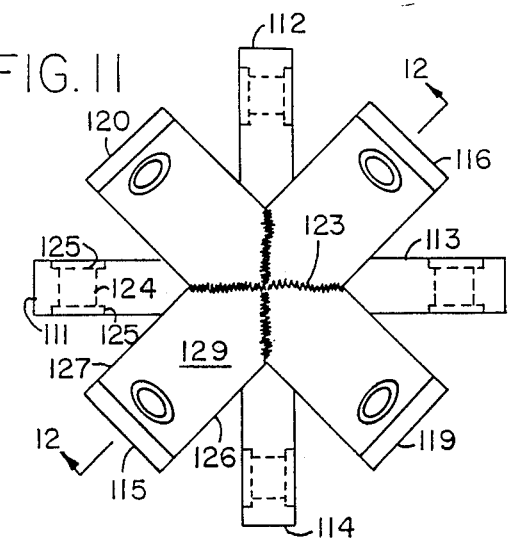
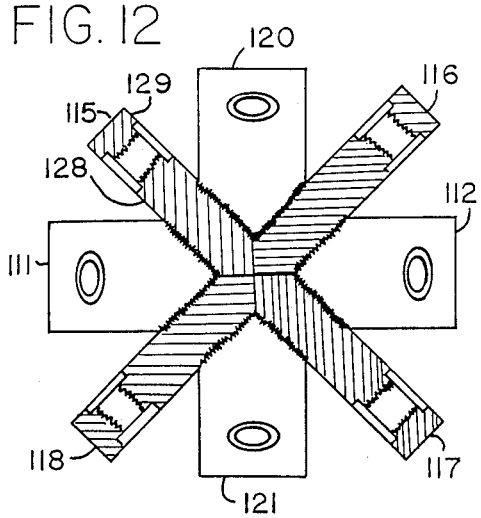

OCTET SPACE FRAME STRUCTURE AND COMPONENTS FOR ASSEMBLING SUCH SPACE FRAMES

BACKGROUND OF THE INVENTION

1. Field of the Invention

This invention relates to the field of space frame structures, and in particular to frameworks of struts utilizing octahedron and tetrahedron geometry and components for realizing such structures.

2. Prior Art

Space frame systems involving assemblages of octahedrons and tetrahedrons have been known for many years. Such a system was described, for example, in U.S. Pat. No. 2,986,241 issued in 1961 to R. Buckminster Fuller. Dr. Fuller coined the term "octet" to describe structures which involve octahedron/tetrahedron geometry. As envisioned by Dr. Fuller, a space frame or truss having octet geometry can be made up of modular struts coupled together a their ends. Dr. Fuller disclosed that such structures have extremely favorable strength to weight ratios.

The present invention improves on the octet space frame invented by Dr. Fuller in that it allows even better strength to weight ratios to be attained. An additional feature of the present invention is the substantially simpler assembly effort required.

SUMMARY OF THE INVENTION

The basic building block of an octet structure includes both octahedron and tetrahedron shapes. These building blocks are assembled from uniform sized struts, an octahedron requiring twelve struts and a tetrahedron six. The struts form the edges of the building blocks and, in a completed truss, each single strut is a part of several adjacent building blocks. That is, a single strut in the interior of a truss, for example, at one time forms an edge of two adjacent octahedrons and two adjacent tetrahedrons. The ends of the struts are tied together by connectors, which as will be described in detail below, may be constructed to allow easy assembly of the structure.

One octahedron and two tetrahedrons assemble to form the fundamental "octet" unit. The replication of the fundamental octet unit in one direction results in an "octet mast", which can be of any desired length, depending on the number of fundamental units assembled. Replication of octet units in two or three directions results in an "octet truss". In other words, linear replication results in a pole, replication in two directions results in a sheet (having the thickness of an octet unit), and replication in three directions results in a volume.

As disclosed by Dr. Fuller, an octet truss space frame is suitable for constructing relatively large structures having very favorable strength to weight ratios. The present invention improves on the octet truss as described by Dr. Fuller by fabricating octet truss structures using struts which, instead of being simple tubular struts, are octet masts comprised of smaller tubular struts. This type of construction provides even more favorable strength to weight ratios than disclosed by Dr. Fuller and makes possible much larger structures. Using the principles of the present invention, it is possible to construct structures having higher yet strength to weight ratios. This is accomplished by using a second expansion octet mast as a strut. That is, the struts which form the final space frame are octet masts whose struts, in turn, are also octet masts. A second expansion strut is not the limit. As many iterations as necessary to achieve the desired structure are possible. Since the ratio of strength to weight improves with each iteration, it can be seen that the principles of the present invention will allow extremely large structures with extremely favorable strength to weight ratios to be fabricated.

The struts which form the octahedron and tetrahedron shapes of the present invention must be securely joined at their ends so that structural integrity can be maintained. In any practical structure, the number of such joints is so large that the design of the joint from the point of view of ease of assembly is very important. In the case of structures to be built in outer space, assembly without tools, and possibly by robots, are also important considerations. It is also desirable that individual struts in a truss be removable and replaceable without having to disturb adjacent struts. In one of its aspects, the present invention involves a novel connector piece for joining the ends of the struts which allows simple, rapid, and secure assembly and also allows individual struts to be removed or replaced easily. The invented connector piece also results in an aesthetically pleasing structure.

In one embodiment shown, the assembly is accomplished by merely sliding the strut laterally along a face of the connector piece until the strut snaps into place. The assembly requires no tools or separate fasteners. The connector piece has an overall shape which can be viewed as two interpenetrating or as eight tetrahedrons covering the faces of an octahedron. It can be either solid or hollow, as desired. The strut ends fit between adjacent faces of the connector piece and may be retained in various possible ways as will be described in detail below.

A more detailed explanation of the invention in its various aspects can be had by reference to the following detailed description and the appended drawings.

BRIEF DESCRIPTION OF THE DRAWINGS

FIG. 1A is a perspective view of a first preferred embodiment of a strut used in connection with octet geometry space frames, shown without fastening means, for clarity.

FIG. 1B is a cross sectional view taken at 1B—1B of FIG. 1A.

FIG. 2 is a perspective view of a first preferred connector piece used to join the struts which form octet geometry space frames, shown without fastening means, for clarity. FIGS. 2A and 2B depict two tetrahedrons which are combined in FIG. 2C to show the completed connector piece.

FIGS. 3A and 3B are an end view and side view respectively of one end of a strut similar to that shown in FIG. 1, but showing a first preferred retaining mean, FIG. 3C is a partial cross sectional view of the strut of FIG. 3A taken in the direction 3C—3C of FIG. 3A.

FIG. 4A is a head on view of two adjacent faces of a connector piece similar to that shown in FIG. 2, but with retaining means for use with the strut of FIG. 3.

FIG. 4B is a partial cross section view of the connector piece of FIG. 4A taken in the direction 4B—4B 4B of FIG. 4A, FIG. 4C is a partial cross section view of the connector piece of FIG. 4A taken in the direction 4C—4C 4C of FIG. 4A.

FIGS. 5A and 5B are partially sectioned, the sectioned portions being at planes 5A—5A and 5B—5B.

FIG. 7 is a plan view of a small section of an octet truss made according to the principles of the present invention.

FIG. 9A is a head on view of two adjacent faces of a connector piece with a second embodiment retaining means.

FIG. 9B is a partial cross sectional view of the connector piece of FIG. 9A taken on 9B—9B of FIG. 9A.

FIG. 10A and 10B are end and side views respectively of one end of a strut showing a second embodiment retaining means.

FIG. 11 is another embodiment of a connector piece for use with the strut of FIG. 10.

FIG. 12 is a cross sectional view of the connector piece of FIG. 10, taken at 12—12 of FIG. 11.

DESCRIPTION OF THE INVENTION

Figure 5A:
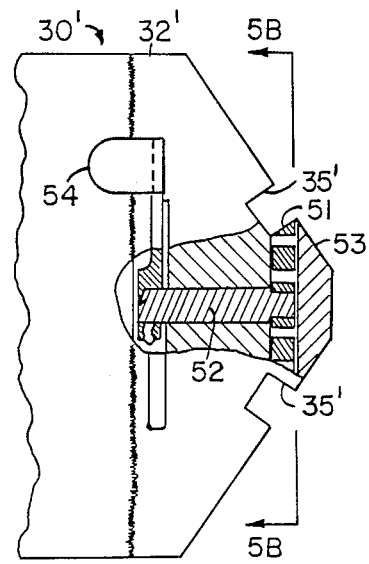
FIGS. 5A and 5B are a side and end view of an end of the strut of FIG. 3, showing a locking mechanism. Both

The present invention involves fastening large numbers of struts at their ends in such sequence as to form space frames comprised of "octet" structures. In one of its aspects, the present invention is concerned with a simple and convenient connection means for joining the ends of the struts to achieve the desired octet form. FIGS. 1 and 2 show first preferred embodiments of a basic strut and a connector piece which can be used in connection with the improved space frames disclosed in this specification or with prior art octet space frames. For purposes of clarity, and as an aid to understanding, FIGS. 1 and 2 depict the basic strut and connector piece without showing retaining or locking means. Such means are described later.

The basic strut, generally indicated by the numeral 10 in FIG. 1, is comprised of a body portion 11 and two identical ends 12. The body portion 11 is preferably tubular and can conveniently have a cross sectional shape the same as that of an octet mast, i.e., a diamond shape, or can have any other desired cross sectional shape, e.g. circular or square. A diamond cross sectional shape may be preferred if robotic assembly is contemplated, since the diamond shape provides a directional reference at all times. The diamond shape also presents a pleasing appearance, especially when used in connection with the interpenetrating tetrahedron connector piece disclosed herein. Additionally, the diamond shape can in some cases provide additional stability. When the diamond shape is used, it is preferred that the body include a cross web, such as web 17, which increases the compressional strength of the body.

The strut ends 12 are secured to the body portion as by welding 16. The chisel shape on the end of the i.e., surfaces 13 and 14, is configured as two adjacent faces of an octahedron for purposes of mating with corresponding faces on the connector piece.

Connector piece 20, shown in FIG. 2C has 12 pairs of surfaces for mating with surfaces 13 and 14, e.g. surfaces 23 and 24. The connector piece can be a solid block, but for purposes of reducing the weight of the space frame it may be preferred to make it hollow. Connector piece 20 can be visualized as being comprised of two interpenetrating tetradedrons. FIGS. 2A and 2B show two tetrahedrons 20A and 20B which, when combined, make up the connector piece 20 in FIG. 2C. If faces 13 and 14 of one strut 10 are abutted to faces 23 and 24 of the connector piece 20, and the faces 13 and 14 of another strut 10 are abutted to faces 25 and 26, it will be seen that the two struts will be at right angles to each other. A third strut abutted to faces 27 and 28 will make an angle of 45° to the plane of the struts previously described, and a 60° angle with each strut. Similar relationships exist between the other pairs of faces of connector piece 20. Thus, it will be realized that connector piece 20 can serve to orient struts at any of the angles needed to form both the octahedrons and tetrahedrons as assembled in the octet form.

Strut 30, one end of which is shown in FIG. 3, is similar to the strut of FIG. 1, except that it is fitted with a first preferred means for retaining the strut in place on a connector piece. FIG. 3 shows the retaining means, but for clarity does not show means for tightening the joint. Such means are discussed later. The mating connector piece is shown in FIG. 4. FIG. 4A is a face on view of two adjacent faces of a connector piece similar to connector piece 20 except that the connector piece 40 is fitted with retaining means to retain struts such as strut 30. The strut retaining means shown in FIGS. 3 and 4 involves mating tongues and slots, but it will be understood by those skilled in the art that other types of interlocking slide means (such as a dovetail slide) could be used in their place. The unique characteristic which is disclosed, is an interlocking slide assembled using a motion 90° to the length of the strut, i.e., a lateral motion.

Strut 30 has a body 31 and two identical ends, only one of which (32) is shown. The end 32 has two faces 33 and 34 which are intended to mate with two adjacent faces of connector piece 40, e.g. faces 43 and 44. A lateral slot 35, adapted to mate with a corresponding tongue 45 on a face of connector piece 40 is set into each of the faces 33 and 34.

To assemble a strut 30 with the connector piece, an end is slid laterally across two corresponding faces of the connector piece with a pair of tongues 45 on the connector piece sliding in corresponding slots 35. The flat 36 on the end of end 32 contains two grooves 37 which mate with snap catches 46 of connector piece 40 to retain strut 30. Snap catches 46 are spring loaded by springs 47 so that when the strut is in its assembled location, the spring catches 46 straddle the land 38 between grooves 37. Retainer 48 positions and retains spring catches 46. The use of two spring catches 46 allows a strut to be inserted from either side of the connector. If one of the spring catches as shown in FIG. 4 were to be replaced with a fixed stop, toolless assembly can still be accomplished, but it can only be accomplished from the side of the remaining spring catch.

Figure 5B:
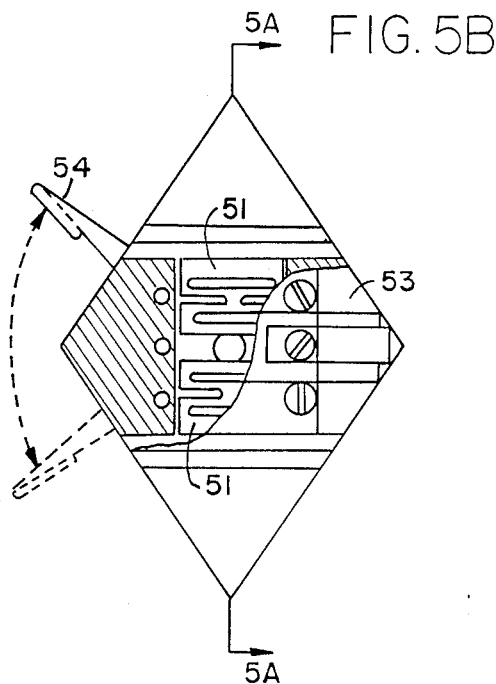

While the struts and connectors which have been described above will allow an octet mast or octet truss to be constructed, because of the clearances and tolerances necessary to permit assembly, there will inevitably be a certain amount of play or looseness in the connections, and thus some lack of tightness in the completed mast or truss. It is therefore preferable that the joints be tightened or locked into position. FIG. 5 (A and B) shows a first preferred means for tightening the joint between struts, such as strut 30', and connector pieces, such as connector piece 40. The strut end 32' shown in FIG. 5 is similar to strut end 32 except for the inclusion of joint tightening means. A pair of clamp pieces 51 ride in a slot milled or otherwise formed in end 32'. The clamp pieces 51 are cut away as shown so as to be somewhat compressible. They ride against shaft 52 which has two flats in the area contacting clamp pieces 51. Thus if shaft 51 is rotated 90° from the position illustrated, the clamp pieces 51 will move slightly into slots 35'. If the strut end 32' were assembled to a connector piece such as connector piece 40 with tongues 45 in slots 35', the motion of clamp pieces 5 would cause the connector piece to press tightly against end 32'. The compressibility of the clamp pieces assures that adequate clamping force will be applied, even though the dimensions of the parts may vary because of dimensional tolerances. Clamp pieces 51 are retained in the slot in end 32' by retainer 53. Lever 54 is fastened to the end of shaft 52 opposite the flats and is used to lock and unlock strut end 32' from a connector piece, the position shown dotted in FIG. 5A being the locked position while the solid position (corresponding to the drawn position of shaft 52) is the unlocked position. When lever 54 is in its solid drawn position, the end 32' can be slid into engagement with one of the pairs of faces of connector 40, and when engaged, can be locked by moving lever 54 to the dotted position.

An octet mast or truss can be assembled from struts and connector pieces by assembling them in the proper sequence until the desired structure results. No tools of any kind are required for assembly. The parts are assembled and locked manually, i.e., without the necessity of using tools of any sort. Because of the simplicity and regularity of the assembly process, it will be realized that it can be automated and done by robot if desired. A strut can easily be removed from a connector piece, even though the truss is completely assembled. It is only necessary to unlock any tightening mechanism, insert a blade to retract a spring catch 46 and slide the strut out of engagement with the connector piece.

Under some conditions, e.g., in outer space, the transmission of shock and vibration in a space frame can be a problem. To reduce such transmission, the mating surfaces between the struts and the connector pieces may be coated with vibration absorbing material.

The basic struts and connector pieces as described above can be assembled into octet truss space frame structures as described in Dr. Fuller's '241 patent mentioned above for example, or in accordance with a second aspect of the present invention, they can be assembled into an octet mast configuration which in turn is used as a strut of a larger octet truss space frame.

Figure 6:
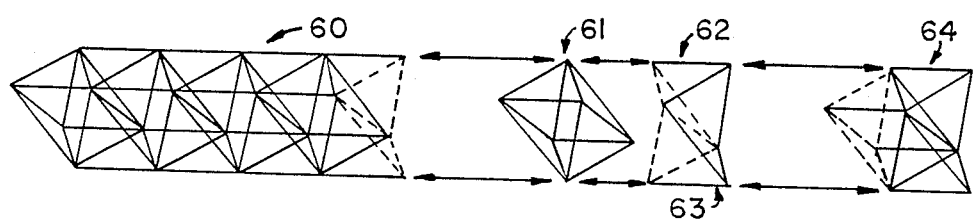
FIG. 6 is an exploded view of an octet mast.

An octet mast is an elongated framework structure made up of interconnected struts characterized by a repeating sequence of octahedron and tetrahedron shapes. FIG. 6 is an exploded view of a section of an octet mast showing that the basic building block of the mast 60 consists of an octahedron 61 and two tetrahedrons 62 and 63. When assembled, the octahedron 61 and the two tetrahedrons 62 and 63 form an octet unit 64. Replicating the basic building blocks results in an octet mast. A mast of any desired length can be fabricated by repeating the sequence of one octahedron and two tetrahedrons until the desired length is attained. As discussed herein, an octet truss using octet masts as strut elements can provide very large and efficient structures. FIG. 7 is a plan view of a small section of an octet truss space frame made up of struts which are octet masts. Some details of the octet mast construction are not shown, for clarity.

The truss section 70 as shown in FIG. 7 is a part of a flat panel. It should be understood that the near and/or far surfaces of the panel can be filled in, to whatever extent desired with octet units to provide surfaces having smaller openings. That is, for example, if the truss of FIG. 7 was intended to be used as the framework for a floor of a marine platform, and the span between the octet mast/struts making up the top plane of the floor (e.g. octet mast/struts 71, 72, and 73) was too great to support the flooring to be used, the space between these members could be filled in to whatever degree is necessary using octet mast sections.

As noted above, a second (or greater) expansion of the octet mast/strut is considered to be within the scope of the present invention. That is, in the second expansion truss, the struts as shown in FIG. 71, e.g. struts 74 and 75, instead of being tubular struts, as in the first expansion truss, are octet masts, resulting in a lower weight for a given strength.

Figure 8:
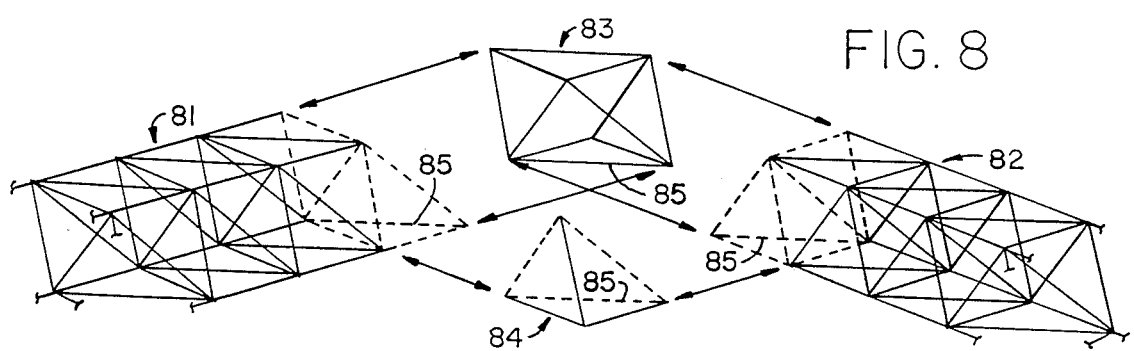
FIG. 8 is an exploded view of the joint between two octet masts.

FIG. 8 is an exploded view of a typical joint between two octet mast/struts, identified by the numerals 81 and 82, illustrating the fact that no special means are required to make the connections between octet mast/struts. The joining of two octet mast/struts is accomplished automatically due to the fact the intersection includes struts which are common to both octet masts. The struts which are common to octet masts 81 and 82 can be seen to be the struts which form octahedron 83 and tetrahedron 84. As an aid in visualizing the interconnection, struts which appear in the exploded view of FIG. 8 more than once are shown solid at one appearance only, and dotted at all other appearances. For example, strut 85 appears in FIG. 8 four times; it is shown solid on octahedron 83 and dotted at each other appearance.

While FIG. 8 is illustrative of how connections are made between octet mast/struts, it is in fact somewhat simplified in that in actual structures each joint involves joining 6 to 12 octet mast/struts rather than just 2, as shown. FIG. 8, nevertheless, illustrates the principle involved.

A second embodiment of a connector piece with a second means of joining struts is shown in FIG. 9, and an end of an accompanying strut is shown in FIG. 10. The connector piece 90 of FIG. 9 is similar to the connector pieces 20 and 40 except for the strut retaining means. Faces 93 and 94 correspond to the faces 23 and 24, for example, of connector piece 20. Lug 95, which is set central in the space between faces 93 and 94 contains a tapped hole 96 with counterbores 97 on each side.

Strut 100 has an end 102 including an offset web 105. Bolt 106, with retaining "C" ring 107, is positioned on web 105 so that it will mate with the tapped hole 96 when surfaces 103 and 104 of end 100 abut surfaces 93 and 94. Web 105 is offset enough so that when face 105A is assembled against lug 95, strut 100 will center over faces 93 and 94. "C" ring 107 nests in one of counterbores 97.

FIGS. 11 and 12 show another embodiment of a connector piece for use with the strut of FIG. 10. the connector piece as illustrated in FIGS. 11 and 12 consists of twelve tabs 111-122 radiating from a central region, each tab positioned to orient and retain one strut. Only tabs 111-121 are visible in the figures, 122 being hidden behind tab 119 in FIG. 11. The tabs as shown are secured to one another by welding 123. Each of the tabs has a tapped hole 124 to receive a bolt 106 of a strut 100, and two counterbores 125 to clear "C" ring 107.

As can be seen from the figures, the tabs 111-114, 115-118, and 119-122 will orient struts to lie in three mutually perpendicular planes, with each strut making a 45° angle with respect to each of the two planes it intersects. This geometry results in each strut making a 60° angle with each of its four neighboring struts. The orientation as described is the same strut orientation as achieved by the previously described connector pieces, and is that needed to obtain the octet structures desired Each of the strut ends 102 includes a "U" shaped slot comprised of bottom face 105A of web 105, and side faces 108 and 109. This slot can be used to orient the strut when used in conjunction with the connector piece illustrated in FIGS. 11 and 12. The mating surfaces of, e.g., tab 115 would be surfaces 126 and 127, and one of surfaces 128 and 129, depending on which direction the strut is assembled. Bolt 106, threaded into tapped hole 124 will provide the mechanical connection between the strut and the tab.

What has been described is a novel octet based space frame system, and components which are useful in assembling such a space frame The components disclosed can also be used in connection with prior art octet space frames. Various adaptations and modifications within the spirit of the claims hereto will no doubt occur to those skilled in the art. Such adaptations and modifications are intended to be covered by the following claims.

I claim:

1. A connector/strut assembly for use in an octet space frame which comprises:
   (a) a connector piece having twelve pairs of faces for orienting struts, each of said faces being at least a portion of one face of a geometric shape formed by two interpenetrating tetrahedrons;
   (b) an elongate strut having a body portion and two end portions, each end portion having two place surfaces adapted to mate with one of said pairs of faces for orienting said strut with respect to said connector piece; and
   (c) attaching means for attaching one end of said strut to said connector piece, said attaching means including an interlocking slide and a spring catch.

* * * * *